P. K. DEDERICK.
Baling-Presses.
No. 151,012.    Patented May 19, 1874.
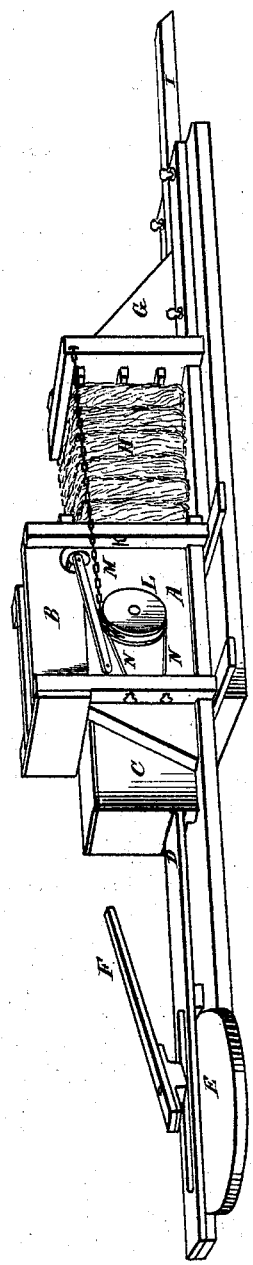
Witnesses  
A. W. Dederick  
David DeFiere
Inventor  
P. K. Dederick

UNITED STATES PATENT OFFICE.

PETER K. DEDERICK, OF ALBANY, NEW YORK.

IMPROVEMENT IN BALING-PRESSES.

Specification forming part of Letters Patent No. 151,012, dated May 19, 1874; application filed September 9, 1872.

*To all whom it may concern:*

Be it known that I, P. K. DEDERICK, of Albany, in the county of Albany and State of New York, have invented certain Improvements in Baling-Presses, of which the following is a specification:

My invention is particularly adapted to baling cotton, in consequence of the pressed material being open to receive the cloth after passing from the press-box, and is constructed as per description following, reference being had to the accompanying drawing, which shows a perspective of my invention.

A is the press-box; B, the hopper. C is the plunger; D, the pitman; E, eccentric; F, the horse-lever. G is the head; H, the bale. I is a friction-slide. L is a friction-wheel. K are the retaining-shoulders or end of the press-box. The cotton is deposited into the hopper B, from whence it falls of its own gravity into the press-box A, and is forced against the head G by the plunger C, which is operated by the cam or eccentric E, or a crank, if preferred, through means of the connecting-pitman D. Any cotton overlapping the plunger is pressed or folded down by the roller suspended by springs in the end of the hopper B, the horse being attached to the lever F. The cotton being thus pressed against the head G overcomes the friction-slide and strap, and forces it back, thus allowing the pressed cotton to pass from the box or behind the shoulders, which may be formed with teeth, which prevents its return; and the operation being repeated the bale is thus built up in sections, as H, having all of its sides clear of all obstructions for putting on the cloth; and the bale after being tied off is removed by slacking back on the friction-head, and after the bale is removed the head is placed against the front of the press-box again for the next operation.

Having thus described my invention, I claim—

1. The combination of the press-box A, plunger C, and friction-head G.

2. The eccentric E, pitman D, plunger C, in combination with the press-box A and friction-head G, substantially for the purpose set forth.

P. K. DEDERICK.

Witnesses:
   A. M. DEDERICK,
   M. E. DEDERICK.